(12) United States Patent
Lenel

(10) Patent No.: US 8,519,278 B2
(45) Date of Patent: Aug. 27, 2013

(54) PHOTOVOLTAIC JUNCTION BOX

(75) Inventor: Daniel Andreas Lenel, Johnson, VT (US)

(73) Assignee: Amphenol Corporation, Wallingtonford, CT (US)

( * ) Notice: Subject to any disclaimer, the term of this patent is extended or adjusted under 35 U.S.C. 154(b) by 326 days.

(21) Appl. No.: 13/028,758

(22) Filed: Feb. 16, 2011

(65) Prior Publication Data

US 2012/0205149 A1 Aug. 16, 2012

(51) Int. Cl.
*H05K 7/20* (2006.01)
(52) U.S. Cl.
USPC .......................... 174/548; 361/692
(58) Field of Classification Search
USPC ................. 174/547, 548; 361/692
See application file for complete search history.

(56) References Cited

U.S. PATENT DOCUMENTS

| | | | |
|---|---|---|---|
| 6,374,912 B1 * | 4/2002 | LaGrotta et al. ............. | 165/185 |
| 7,288,717 B1 | 10/2007 | Lee | |
| 2006/0054210 A1 | 3/2006 | Proisy et al. | |
| 2007/0137689 A1 | 6/2007 | Feldmeier et al. | |
| 2008/0110490 A1 | 5/2008 | Duesterhoeft | |
| 2008/0115911 A1 | 5/2008 | Duesterhoeft | |
| 2008/0190477 A1 * | 8/2008 | Hattori ......................... | 136/246 |
| 2009/0025778 A1 | 1/2009 | Rubin et al. | |
| 2009/0084570 A1 | 4/2009 | Gherardini et al. | |
| 2009/0122492 A1 | 5/2009 | Fischer et al. | |
| 2009/0139763 A1 * | 6/2009 | Nagai et al. .................. | 174/547 |
| 2010/0218797 A1 * | 9/2010 | Coyle et al. .................. | 136/243 |
| 2011/0011641 A1 * | 1/2011 | Pfeffer ......................... | 174/547 |
| 2012/0125682 A1 * | 5/2012 | Lu et al. ....................... | 174/548 |

FOREIGN PATENT DOCUMENTS

| | | |
|---|---|---|
| DE | 102006012665 | 10/2006 |
| DE | 102007020845 A1 | 10/2008 |
| JP | 2002058152 | 2/2002 |
| WO | 2010025223 A2 | 3/2010 |

* cited by examiner

*Primary Examiner* — Hung Ngo
(74) *Attorney, Agent, or Firm* — Blank Rome LLP

(57) ABSTRACT

A photovoltaic junction box that comprises a housing that has at least first and second sides and the second side has at least one heat dissipating component. A conductor plate is received in the housing. The conductor plate supports at least one heat emitting component and at least one heat conducting component corresponding to the heat dissipating component of the housing. A mounting flange extends from the second side of the housing. At least a first gap is located between the second side of the housing and the mounting flange. The gap creates an air channel that allows air to flow between the housing and the mounting flange.

25 Claims, 4 Drawing Sheets

PHOTOVOLTAIC JUNCTION BOX

FIELD OF THE INVENTION

The present invention relates to a junction box for photovoltaic applications. More specifically, the junction box includes heat dissipating components for more effective heat dissipation at higher currents.

BACKGROUND OF THE INVENTION

Photovoltaic modules, such as solar panels, convert solar energy to electricity. The cells within a module are typically connected in series by means of copper ribbons. The copper ribbons are terminated in a specially designed junction box where the current is collected and transferred to a pair of short cables that end in connectors. An array of photovoltaic modules is typically interconnected using the cables terminated in the junction boxes.

The cells of photovoltaic modules are connected in series so that the sum voltages of the cells is at a useable voltage level. When exposed to light, photovoltaic cells generate electricity. When shaded, however, photovoltaic cells not only cease to produce electricity, but also become poor conductors of electricity. Because the cells are connected in series, a single shaded cell creates a bottleneck for all the other cells. When that happens, the shaded cell turns into a resistance heater, which destroys the power of its neighbors. The shaded cell can also heat up to such an extent that it can destroy the module, expose dangerous voltage carrying conductors and in some cases cause a fire. Thus a single shaded photovoltaic cell may render a PV installation useless.

To avoid this, bridging diodes are used. The bridging diode is wired in parallel to the string of cells in such a way that when the cells all behave normally, the diode is in reverse bias condition, no current flows over the diode. If one or more cells become shaded, the shaded cells produce a voltage drop instead of creating a voltage increase, so that the bias voltage over the diode changes polarity and the diode is now in forward mode, conducting the current. In doing this, the diode effectively bridges the shaded cells and prevents catastrophic failure as well as a means to conduct the current of the unshaded cells and therefore still generating power. Those bypass diodes are typically built into the junction box. The forward voltage drop over the diodes, however, generates heat within the diodes which must be dissipated to prevent the diode from overheating. If the heat generated is not properly dissipated, the diode will reach a thermal runaway status and be destroyed in the process. In this way, the failure of a single diode may render an entire string of panels useless. The heat generated by the diodes within a junction box may not be conducted to the module, since this may cause a hot spot and contribute to a thermal runaway situation of the photovoltaic cells in close proximation. The junction boxes also must meet certain industry standard requirements regarding heat and temperature.

Therefore, a need exists for a photovoltaic junction box that can accommodate higher currents and more effectively dissipate heat while also meeting the temperature requirements of industry standards.

SUMMARY OF THE INVENTION

Accordingly, the present invention provides a photovoltaic junction box that comprises a housing that has at least first and second sides and the second side has at least one heat dissipating component. A conductor plate is received in the housing. The conductor plate supports at least one heat emitting component and at least one heat conducting component corresponding to the heat dissipating component of the housing. A mounting flange extends from the second side of the housing. At least a first gap is located between the second side of the housing and the mounting flange. The gap creates an air channel that allows air to flow between the housing and the mounting flange.

The present invention also provides a photovoltaic junction box that comprises a housing that has at least first and second sides and each of the first and second sides has a plurality of heat dissipating components, respectively. A conductor plate is received in the housing. The conductor plate supports at least one heat emitting component and a plurality of heat conducting components corresponding to the heat dissipating components of the second side of the housing. A mounting flange extends from the second side of the housing. At least one gap is located between the second side of the housing and the mounting flange. The gap creates an air channel allowing air to flow between the housing and the mounting flange. The housing may be made of an electrically insulating material.

The present invention further provides a photovoltaic junction box that comprises a housing that has at least first and second sides and first and second heat dissipating means. A conductor plate is received in the housing. The conductor plate supports at least one heat emitting component. A mounting flange extends from the second side of the housing. An air channel means allows air to flow between the housing and the mounting flange.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring to FIGS. 1-5, a photovoltaic junction box 100 according to an exemplary embodiment of the invention is preferably used in a solar connection system, such as interconnection of a series of solar modules. The junction box 100 may be, for example, mounted to a solar module, such as a solar panel, to collect solar energy therefrom and eventually convert that energy to electrical power downstream. The junction box 100 has an improved thermal conductivity design that provides greater heat dissipation and allows for higher current application.

Figures 1, 3:
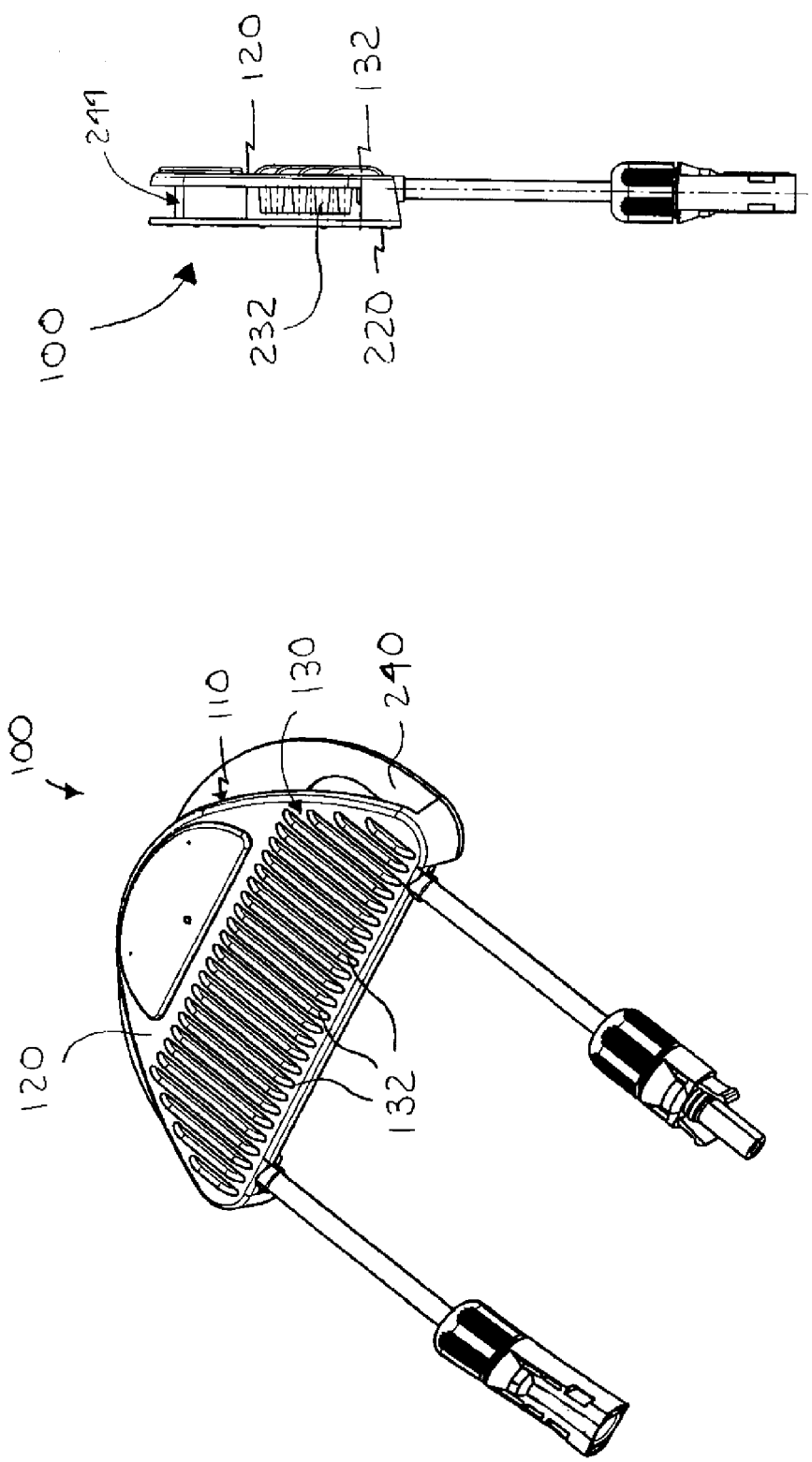
FIG. 1 is a first side perspective view of a junction box according to an exemplary embodiment of the present invention.
FIG. 3 is a side elevational view of the junction box illustrated in FIG. 1.

The junction box 100 generally includes a heat dissipating housing 110 that receives a conductor plate 400 (FIG. 4) electrically connectable to a solar module (not shown). The housing 110 may be overmolded on the conductor plate 400 to provide a complete seal and absence of voids that invite condensation issues. Alternatively, the housing 110 may be formed by attaching two molded housing halves and filling the void with a potting agent. The housing 110 is generally flat with first and second opposite sides 120 and 220. Heat dissipating components 130 and 230 are preferably provided on both sides 120 and 220, respectively. The heat dissipating components 130 on the first housing side 120 may be one or more elongated fins 132 extending generally across the housing 110. Alternatively, other heat dissipating components may be used such as finger heat exchangers. The heat dissipating components 230 on the opposite or second side 220 of the housing 110 may be one or more outwardly extending fingers 232. Other heat dissipating components may be used, such as fins. As best seen in FIG. 3, the fins 132 and the fingers 232 extend from the housing 110 in opposite directions to one another. The fins 132 and the fingers 232 dissipate heat by convection to the ambient air. The efficiency of the convection process is greatly improved by the increased surface area and the special shape and staggered arrangement of the fin and finger heat exchangers that force the flow of air in such a way that the flow pattern of the air completely engulfs the heat exchanger surface. To further facilitate the dissipation of heat, the housing 110 may be formed of an electrically insulating material, such as any thermoplastic polymer.

Figure 2:
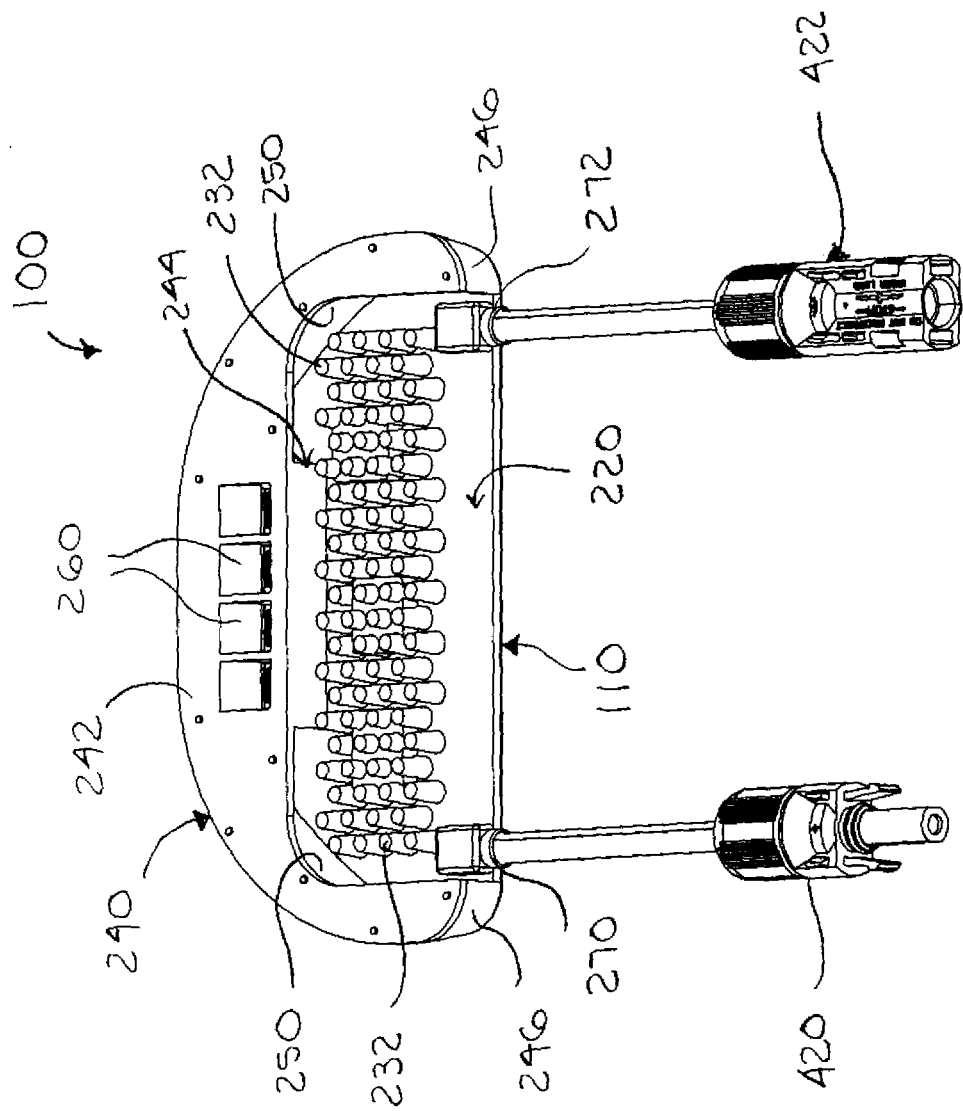
FIG. 2 is a second side perspective view of the junction box illustrated in FIG. 1.

As best seen in FIG. 2, a mounting flange 240 extends from the second side 220 of the housing 110. The mounting flange 240 has a generally C-shape and includes a substantially flat mounting surface 242 configured to mount to a module. The mounting flange 240 is spaced from the housing second side 220 by a plurality of extensions including a main extension 244 and first and second secondary extensions 246. Although a plurality of extensions are preferred, one extension may be used to connect the flange 240 to the housing 110. The main extension 244 is preferably coupled to a middle portion of the mounting flange 240 and the second extensions 246 are preferably coupled to the opposite ends of the mounting flange 240, as best seen in FIG. 2. One or more gaps 250 are formed between the mounting flange 240 and the housing 110 to create air flow channels for further cooling the housing 110. That is, because the mounting flange 240 is spaced from the housing 110 by the extensions 244 and 246, the housing 110 is spaced from the module on which the junction box 110 is mounted, thereby allowing air to flow between the housing 110 and the module. That air flow provides cooling against the heat emitting from the diodes.

One or more termination compartments 260 may be provided in the mounting flange 240 and the main extension 244 for receiving connection tabs 410, respectively, of the conductor plate 400. The compartments 260 are open at the mounting surface 242 of the mounting flange 240, thereby exposing the ends of the connection tabs 410. During the installation of the junction box, the connection tabs 410 are electrically connected to the bus bars of the photovoltaic module by welding, soldering or other mechanical means on which the junction box 100 is mounted.

Figure 4:
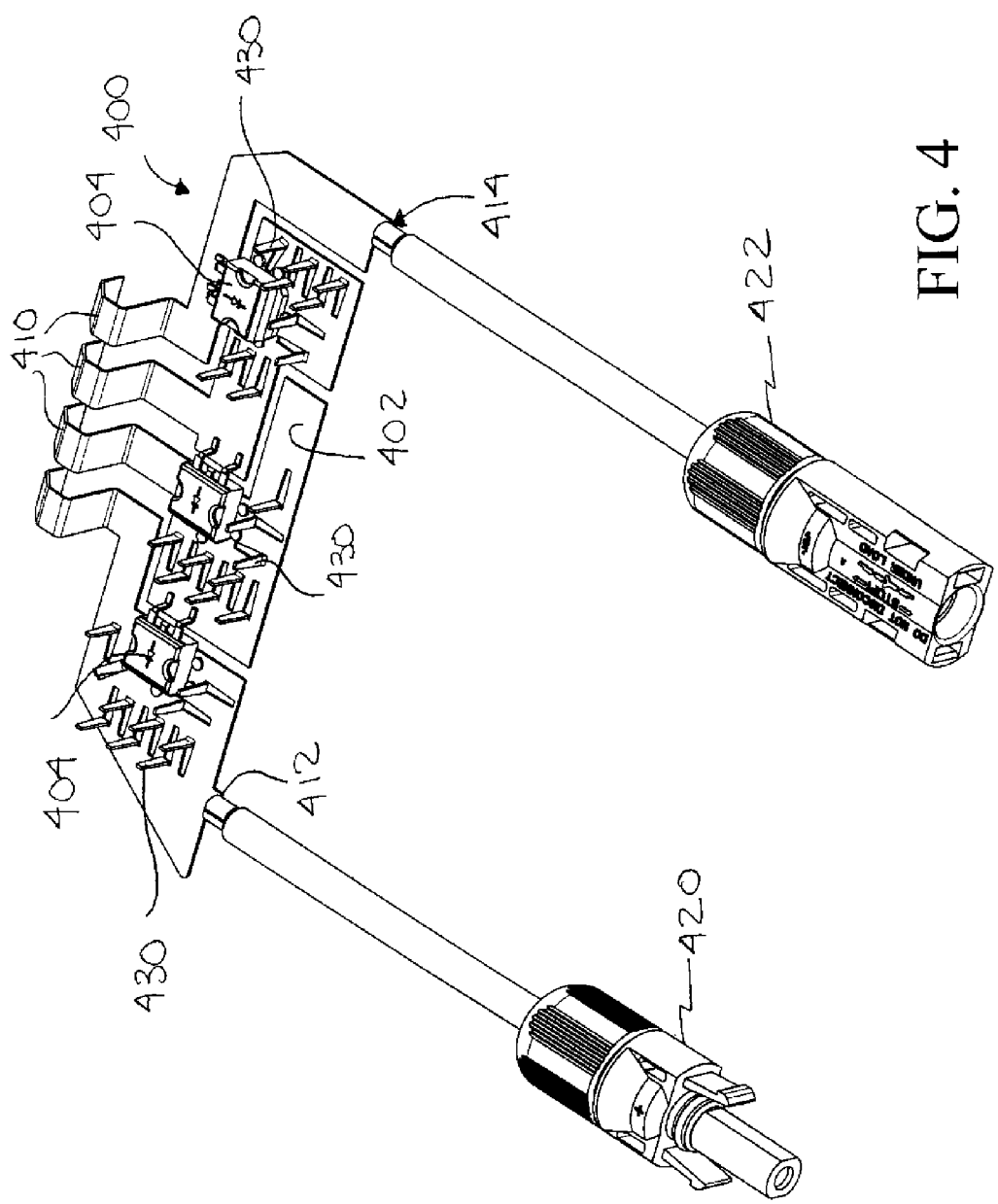
FIG. 4 is a perspective view of a conductor plate of the junction box illustrated in FIG. 1.

The housing 110 may also include first and second ports 270 and 272 for accommodating first and second terminals 412 and 414 of the conductor plate 400. The first and second terminals 412 and 414 of the conductor plate 400 are designed to connect to first and second connectors 420 and 422. For example, leads of the first and second connectors 420 and 422 may be crimped to the first and second terminals 412 and 414, as seen in FIG. 4. The first and second connectors 420 and 422 are preferably male and female connectors (or vice versa), respectively, that allow series connection of modules via their junction boxes.

As best seen in FIG. 4, the conductor plate 400 has a support surface 402 that supports heat emitting components 404, such as diodes, integrated circuit containing semi-conductors or other semi-conductors. The diodes 404 are mechanically and electrically coupled to the support surface 402 of the conductor plate 400. For example, conductive leads of the diodes 404 may be soldered to the surface 404 of the plate 400. The conductor plate 400 may start out as a single plate when the diodes 404 are soldered in place; then bridges in the plates may be removed (cut) resulting in single sections for the diodes 404 of the conductor plate 400 that are electrically and thermally separated. FIG. 4 shows the conductor plate 400 with the bridges already removed.

Figure 5:
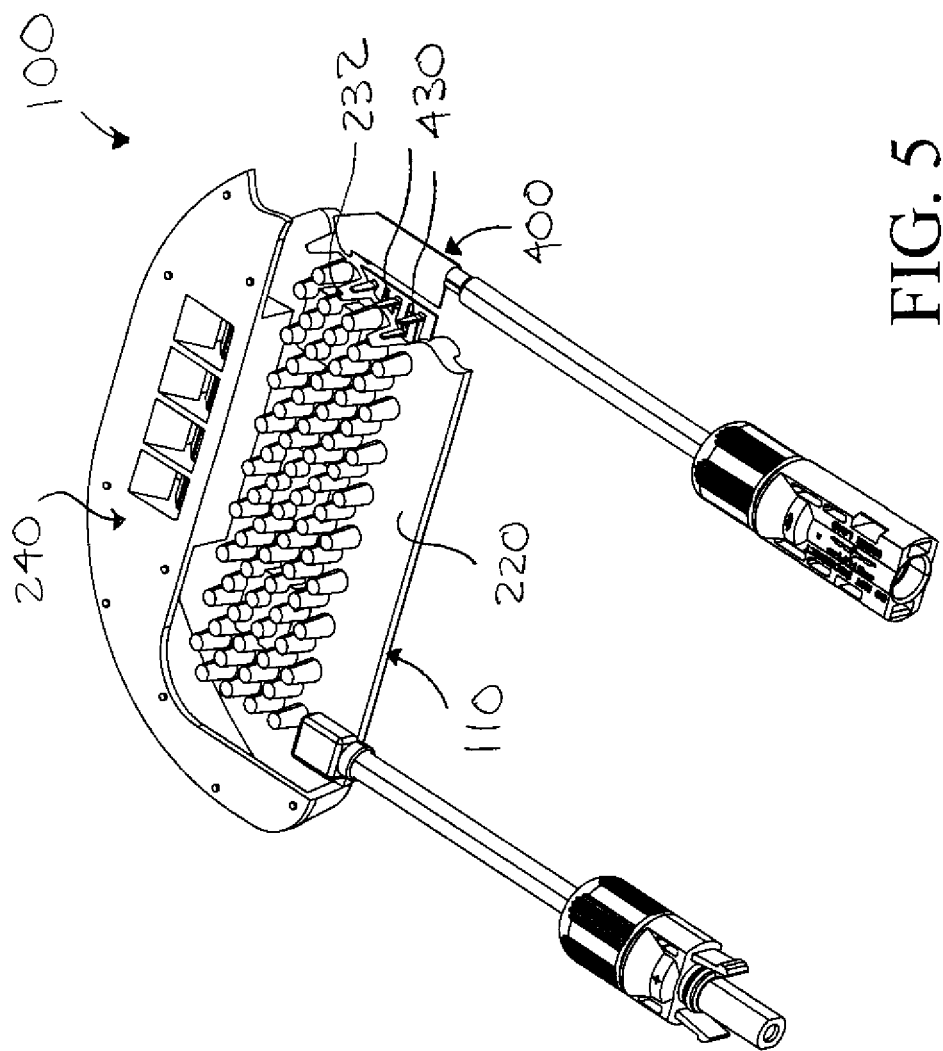
FIG. 5 is partial perspective view of the junction box illustrated in FIG. 1, showing a portion of the housing removed.

Heat conducting components 430 extend substantially perpendicularly from the support surface 402 of the conductor plate 400. The heat conducting components 430 may be conducting fingers or fins cutout from the conductor plate 400, as seen in FIG. 4. The heat conducting fingers 430 are preferably arranged in groups around the diodes 404. The conducting fingers 430 correspond to the heat dissipating fingers 232 of the housing 110, as best seen in FIG. 5. That is, each heat dissipating finger 232 of the housing 110 covers an individual conducting finger 430 of the conductor plate 400. The heat conducting fingers 430 of the conductor plate 400 act to transfer the heat emitted from the diodes 404 to the fingers 232 of the housing 110 for dissipating the heat.

Heat dissipation of the junction box 100 is thus accomplished as described above using at least one of or a combination of the fins 132 on the housing 110, the fingers 232 on the housing 110, the heat conducting fingers 430 of the conductor plate, the air channels 250 between the mounting flange 240 and the housing 110, and the thermal conductive material of the housing 110. Alternative heat dissipation features may be employed, such as fins.

While a particular embodiment has been chosen to illustrate the invention, it will be understood by those skilled in the art that various changes and modifications can be made therein without departing from the scope of the invention as defined in the appended claims.

What is claimed is:

1. A photovoltaic junction box, comprising:
 a housing having at least first and second sides, said second side having at least one heat dissipating component;
 a conductor plate received in said housing, said conductor plate supporting at least one heat emitting component and at least one heat conducting component corresponding to said heat dissipating component of said housing;
 a mounting flange extending from said second side of said housing; and
 at least a first gap located between said second side of said housing and said mounting flange, said gap creating an air channel allowing air to flow between said housing and said mounting flange.

2. A photovoltaic junction box according to claim 1, wherein
 said at least one heat conducting component of said conductor plate is a heat conduction finger extending from said conductor plate.

3. A photovoltaic junction box according to claim 2, wherein
 said heat conduction finger is a cutout of said conductor plate.

4. A photovoltaic junction box according to claim 2, wherein
said at least one heat dissipating component of said second side of said housing is a finger covering said heat conducting finger of said conductor plate.

5. A photovoltaic junction box according to claim 1, wherein
said conductor plate includes a plurality of heat emitting components and a plurality of heat conducting components.

6. A photovoltaic junction box according to claim 5, wherein
said second side of said housing includes a plurality of heat dissipating components corresponding to said plurality of heat conducting components of said conductor plate.

7. A photovoltaic junction box according to claim 6, wherein
said plurality of heat conducting components include heat conduction fingers; and
said plurality of heat dissipating components include fingers covering said individual heat conduction fingers of said conductor plate.

8. A photovoltaic junction box according to claim 1, wherein
said first side of said housing includes at least one heat dissipating component.

9. A photovoltaic junction box according to claim 1, wherein
said at least one heat dissipating component of said first side of said housing includes at least one elongated fin.

10. A photovoltaic junction box according to claim 1, wherein
said first side of said housing includes a plurality of heat dissipating components.

11. A photovoltaic junction box according to claim 1, further comprising
a second gap disposed between said mounting flange and said second side of said housing that creates an air channel.

12. A photovoltaic junction box according to claim 1, wherein
said housing is one-piece overmolded on said conductor plate.

13. A photovoltaic junction box according to claim 1, wherein
said conductor plate is thermally and electrically conductive.

14. A photovoltaic junction box according to claim 1, wherein
said conductor plate including connection tabs extending through said mounting flange.

15. A photovoltaic junction box according to claim 1, wherein
said at least one heat emitting component is a semi-conductor or an integrated circuit containing semi-conductors.

16. A photovoltaic junction box, comprising
a housing having at least first and second sides, each of said first and second sides having a plurality of heat dissipating components, respectively;
a conductor plate received in said housing, said conductor plate supporting at least one heat emitting component and a plurality of heat conducting components corresponding to said heat dissipating components of said second side of said housing;
a mounting flange extending from said second side of said housing; and
at least one gap located between said second side of said housing and said mounting flange, said gap creating an air channel allowing air to flow between said housing and said mounting flange,
wherein said housing is made of an electrically insulating material.

17. A photovoltaic junction box according to claim 16, wherein
said heat dissipating components of said first side of said housing include a plurality of fins.

18. A photovoltaic junction box according to claim 16, wherein
said heat dissipating components of said second side of said housing including a plurality of fingers.

19. A photovoltaic junction box according to claim 16, wherein
said heat conducting components include a plurality of heat conduction fingers extending from said conductor plate.

20. A photovoltaic junction box according to claim 16, further comprising
a second gap disposed between said mounting flange and said second side of housing that creates an air channel.

21. A photovoltaic junction box according to claim 16, wherein
a said housing is overmolded on said conductor plate.

22. A photovoltaic junction box, comprising
a housing having at least first and second sides and first and second heat dissipating means;
a conductor plate received in said housing, said conductor plate supporting at least one heat emitting component;
a mounting flange extending from said second side of said housing; and
an air channel means allowing air to flow between said housing and said mounting flange.

23. A photovoltaic junction box according to claim 22, wherein
said first heat conducting means includes a plurality of fins extending from said first side of said housing.

24. A photovoltaic junction box according to claim 22, wherein
said second heat conducting means includes a plural of fingers extending from said second side of said housing.

25. A photovoltaic junction box according to claim 22, wherein
said air channel means includes at least one a gap located between said second side of said housing and said mounting flange.

* * * * *